United States Patent [19]

Friedhoff et al.

[11] Patent Number: 5,763,788
[45] Date of Patent: Jun. 9, 1998

[54] PORTABLE DEVICE FOR COUNTING AND SORTING LOAD CYCLES IN SUPPORTING STRUCTURES WITH VARIOUS LOADS

[75] Inventors: Roland Friedhoff, Dinslaken; Günther Kubsch, Gross-Gerau, both of Germany

[73] Assignee: Man Technologie AG, Augsburg, Germany

[21] Appl. No.: 831,661

[22] Filed: Apr. 9, 1997

Related U.S. Application Data

[63] Continuation-in-part of Ser. No. 591,379, Jan. 25, 1996, abandoned.

[51] Int. Cl.⁶ .................. G01B 7/16; G01F 25/00; G01L 1/00
[52] U.S. Cl. .................................. 73/763; 73/786
[58] Field of Search ................. 73/763, 768, 784, 73/786, 787, 804

[56] References Cited

U.S. PATENT DOCUMENTS

| | | | |
|---|---|---|---|
| 4,480,480 | 11/1984 | Scott et al. | 73/769 |
| 4,493,214 | 1/1985 | Roach | 73/786 |
| 4,526,039 | 7/1985 | Ceccon et al. | 73/786 |
| 4,858,473 | 8/1989 | Latour, Jr. et al. | 73/805 |
| 5,421,204 | 6/1995 | Svaty, Jr. | 73/786 |
| 5,520,055 | 5/1996 | Fussinger | 73/762 |

*Primary Examiner*—George M. Dombroske
*Assistant Examiner*—Max H. Noori
*Attorney, Agent, or Firm*—Max Fogiel

[57] ABSTRACT

A device for counting and classifying load cycles in supporting structures with various loads, bridges, cranes, or tracks for example. A measuring instrument (2) is attached to an attachment side (7) of a load-cycle counter (1) and accommodates a mechanical strain amplifier (3). The ends (8 & 8') of the strain amplifier are much thicker and more resistant to strain. Its middle (9), which includes a strain gauge 10, is much thinner and more sensitive to strain. The ends are fastened to the attachment side. Any signal deriving from traction, force, or flection, and emitted by the strain amplifier (3) is forwarded through a digitalizer (4). The data are processed and stored in a signal processor (5).

9 Claims, 1 Drawing Sheet

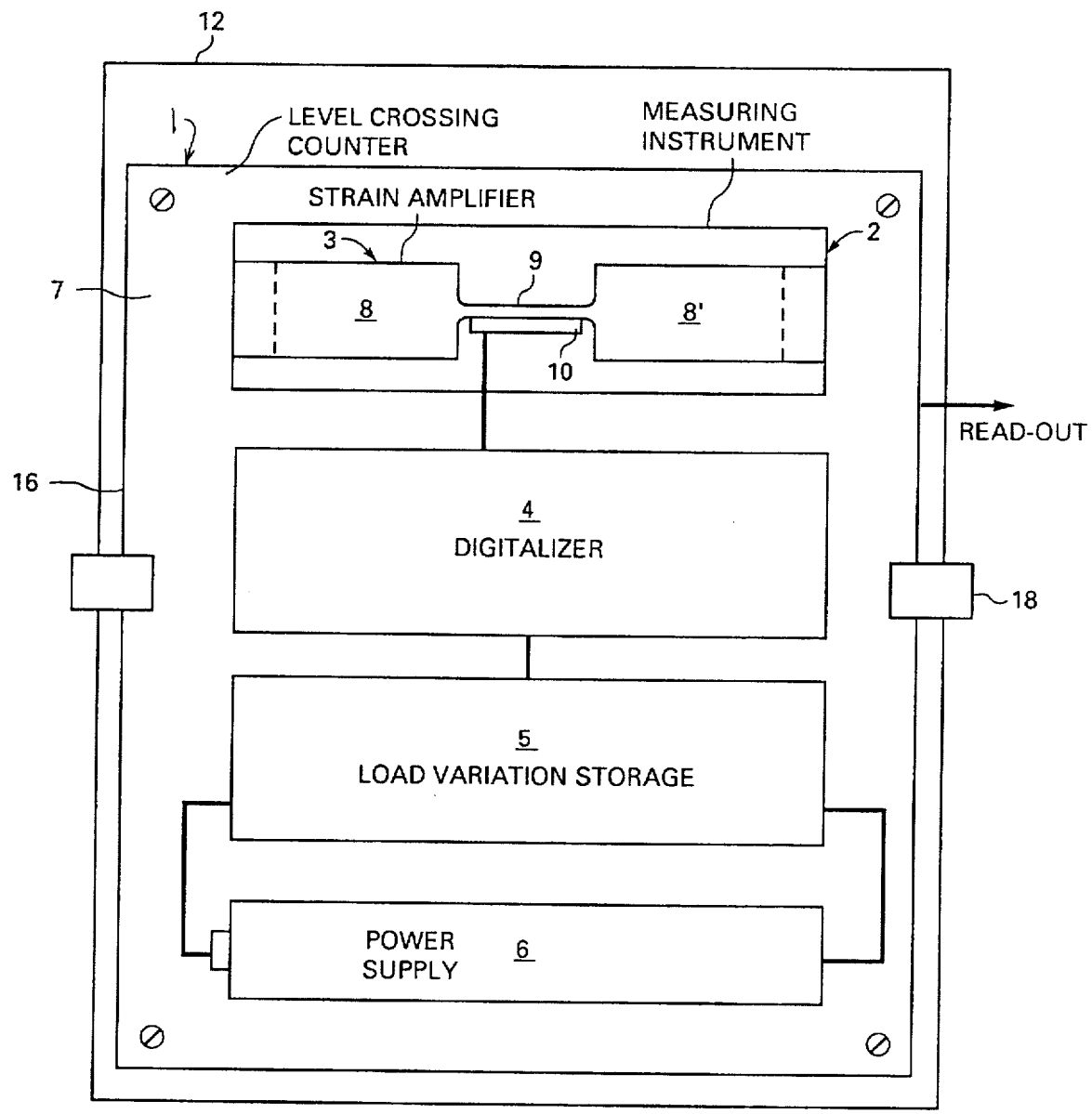

5,763,788

PORTABLE DEVICE FOR COUNTING AND SORTING LOAD CYCLES IN SUPPORTING STRUCTURES WITH VARIOUS LOADS

The present application is a continuation-in-part of the parent application Ser. No. 08/591,379 filed Jan. 25, 1996 now abandoned.

BACKGROUND OF THE INVENTION

The present invention concerns a device for counting and classifying load cycles in supporting structures with various loads, especially bridges.

Some factors that essentially determine the life of such a structure are the frequency and extent of the loads it is subjected to during the period of their occurrence and that are decisive to the material's fatigue.

The life of certain structures, the transportable bridges employed in post-disaster operations for example, is prescribed by specifying how soon the particular construction material may exhibit evidence of fatigue. Such a specification in turn will dictate the limits of reliability.

There are many parameters that affect the life of a bridge. They include support conditions, impact resistance, eccentricity of the vehicle from its midline, and vehicle spectrum (number of drive-overs with actual vehicle weights).

One significant factor with respect to these parameters is impact, although it is physically difficult to determine in terms of each particular load.

Accelerometers often yield errors because it is only the dimension of a vibration that they determine, and not the weight resulting from it.

A heavy weight gradually applied may produce less of a result than an impact exerted by a lighter weight.

The use of strain gauges in conjunction with the rain-flow method of frequency evaluation is known from "Ermittlung des Lastkollectives eines Rotorblattes unter Betriebsbedingungen", DEWEK (Deutsche Windenergie-Konfereenz) 1992, FHS Wilhelmshaven.

This method has limitations when applied for the present purpose, however, because the rain-flow method plots the number of cycles logarithmically over range (twice the amplitude) and mean (average strain).

SUMMARY OF THE INVENTION

An object of the present invention is an improved load-cycle counter that will determine the number of loads in a particular period while simultaneously determining load parameters (vehicle type). The data will be accessible in the event of a power failure. The device will be independent of outside power supply. It will include a display for displaying the data. It will be insensitive to moisture. Finally it will be impact resistant.

The present invention differs from the prior art in that the equipment is secured to one area of the structure being tested and subjected to the same distortions as the structure itself. The overall electromechanical force-detection device operates like a strain gauge and can be accommodated in a protective metal housing, where it will not encounter moisture.

The load-or-vehicle spectrum is classified with a microprocessor. The structural-distribution method is level crossing. The data are displayed and stored and can always be accessed by way of a temporary connection to separate equipment, a laptop for example. This approach ensures no sensitive lines between the test site and the processor.

To ensure optimal processing of the large number of data and prevent using up too much memory, each test is compared to the previous test within a specific interval and only different results are stored. Once a maximum for the overall procedure has been attained, it is transferred to a main memory.

Differentiated testing is ensured by an appropriate mechanical strain transformer that multiplies the empirical strains to improve resolution.

BRIEF DESCRIPTION OF THE DRAWINGS

A schematic view of the essential elements that cooperate in accordance with the present invention.

DESCRIPTION OF THE PREFERRED EMBODIMENTS

A portable load-cycle counter 1 is secured and preferably screwed or clamped to a structure, a bridge, crane, or section of track, for example, that supports various loads.

A measuring instrument 2 is secured to the attachment side 7 of counter 1. Measuring instrument 2 accommodates at least one strain gauge 10 and a mechanical strain amplifier 3. The ends 8 and 8' of strain amplifier 3 are much thicker and more strain-resistant than its middle 9. Ends 8 and 8' are fastened tight to attachment side 7.

Any signal deriving from traction, force, or flection, and emitted by strain amplifier 3 is forwarded through a digitalizer 4, and the data are processed and stored in a signal processor 5.

Counter 1 also accommodates a power supply 6 independent of outside sources.

In summary, applicant provides an arrangement for counting and classifying load cycles in a supporting structure with various loads. The arrangement is particularly applicable to bridges and to converting local strains occurring in the structures, into signals.

The load-cycle counter 1 is portable and independent of outside power sources. The counter has, moreover, a measuring instrument 2, a mechanical strain amplifier 3, a digitalizer 4, a signal processor 5, and a power supply 6, all secured to one point on the structure.

The arrangement is held in a closed encapsulated housing which serves simultaneously as the mechanical strain amplifier.

The load-cycle counter 1 carries out level crossing counting, and the signal processor stores load variations according to load classification and countings. The age of the structure is determined by a specific computation.

The arrangement is protected by the housing against external disturbances, and data from the arrangement is read out on-line over a serial sectional location.

The load-cycle counter 1 is held in a small water-tight protective metal housing 12.

The measuring instrument 2 is attached to a side of the load-cycle counter 1, and accommodates the mechanical strain amplifier 3.

This strain amplifier 3 has ends 8, 8' and a middle portion 9 between these ends. On the middle portion 9, a strain gauge 10 is mounted, and the ends 8, 8' are thicker and more resistant to strain than the middle portion 9. This middle portion is thinner and more sensitive to strain than the ends.

The signal processor 5 is a microprocessor for classifying data and counting and storing applied loads in accordance with their class frequency. This microprocessor also retains the stored applied loads in memory even when the power is interrupted.

The counter may be secured to the structure by screws 14, cement 16, or clamps 18.

The power supply 6 is independent of outside sources of power.

We claim:

1. An arrangement for counting and classifying load cycles in a supporting structure with changing loads, especially bridges, and for converting local strains arising in the structure into signals, comprising: a portable, load-cycle counter independent of outside power sources and having a measuring instrument, a mechanical strain amplifier with a strain gauge, a freely programmable digitalizer, a signal processor for programming and reading out data stored by said digitalizer, and a power supply secured to one point on the structure; a fully closed encapsulated housing holding said arrangement and being simultaneously said mechanical strain amplifier; said counter carrying out level crossing counting; said signal processor storing load variations according to load classification and countings, aging of the structure being determined by a specific computation, said housing protecting said arrangement against external disturbances, data from said arrangement being read out on-line over a serial sectional location; said strain gauge being mounted at a substantially narrowed central part of said mechanical strain amplifier in said measuring instrument; said load-cycle counter having a mounting wall, said measuring instrument being secured to said mounting wall, said counter receiving the same deformations as said structure; planar stresses being transformed by stiff strain elements into a soft strain element for processing the transformed strain; said counter providing remaining life of the structure at specific selection of said level, known life duration and given load spectrum; said housing being free of outside cables; said strain gauge having electrical resistance with amplified variations transmitted to said signal processor through said digitalizer.

2. An arrangement as defined in claim 1, wherein said counter is held in a small water-tight protective metal housing; said data being protected against electromagnetic disturbances.

3. An arrangement as defined in claim 1, wherein said measuring instrument is attached to a side of said load-cycle counter and accommodates said mechanical strain amplifier, said strain amplifier having ends and a middle portion between said ends; a strain gauge on said middle portion, said ends being thicker and more resistant to strain than said middle portion, said middle portion being thinner and more sensitive to strain than said ends.

4. An arrangement as defined in claim 1, wherein said signal processor is a microprocessor for classifying data and counting and storing applied loads in accordance with their class frequency and retaining the stored applied loads in memory even when the power is interrupted.

5. An arrangement as defined in claim 1, wherein said counter is secured to the structure by screws.

6. An arrangement as defined in claim 1, wherein said counter is secured to the structure by cement.

7. An arrangement as defined in claim 1, wherein said counter is secured to the structure by clamps.

8. An arrangement as defined in claim 1, wherein said power supply is independent of outside sources of power.

9. An arrangement as defined for counting and classifying load cycles in a supporting structure with changing loads, especially bridges, and for converting local strains arising in the structure into signals, comprising: a portable, load-cycle counter independent of outside power sources and having a measuring instrument, a mechanical strain amplifier with a strain gauge, a freely programmable digitalizer, a signal processor for programming and reading out data stored by said digitalizer, and a power supply secured to one point on the structure; a fully closed encapsulated housing holding said arrangement and being simultaneously said mechanical strain amplifier; said counter carrying out level crossing counting; said signal processor storing load variations according to load classification and countings, aging of the structure being determined by a specific computation, said housing protecting said arrangement against external disturbances, data from said arrangement being read out on-line over a serial sectional location; said strain gauge being mounted at a substantially narrowed central part of said mechanical strain amplifier in said measuring instrument; said load-cycle counter having a mounting wall, said measuring instrument being secured to said mounting wall, said counter receiving the same deformations as said structure; planar stresses being transformed by stiff strain elements into a soft strain element for processing the transformed strain; said counter providing remaining life of the structure at specific selection of said level, known life duration and given load spectrum; said housing being free of outside cables; said strain gauge having electrical resistance with amplified variations transmitted to said signal processor through said digitalizer; said counter being held in small water-tight protective metal housing, said data being protected against electromagnetic disturbances; said measuring instrument being attached to a side of said load-cycle counter and accommodating said mechanical strain amplifier, said strain amplifier having ends and a middle portion between said ends; a strain gauge on said middle portion, said ends being thicker and more resistant to strain than said middle portion, said middle portion being thinner and more sensitive to strain than said ends; said signal processor being a microprocessor for classifying data and counting and storing applied loads in accordance with their class frequency and retaining the stored applied loads in memory even when the power is interrupted; said counter being secured to the structure by screws; said power supply being independent of outside sources of power.

* * * * *